UNITED STATES PATENT OFFICE.

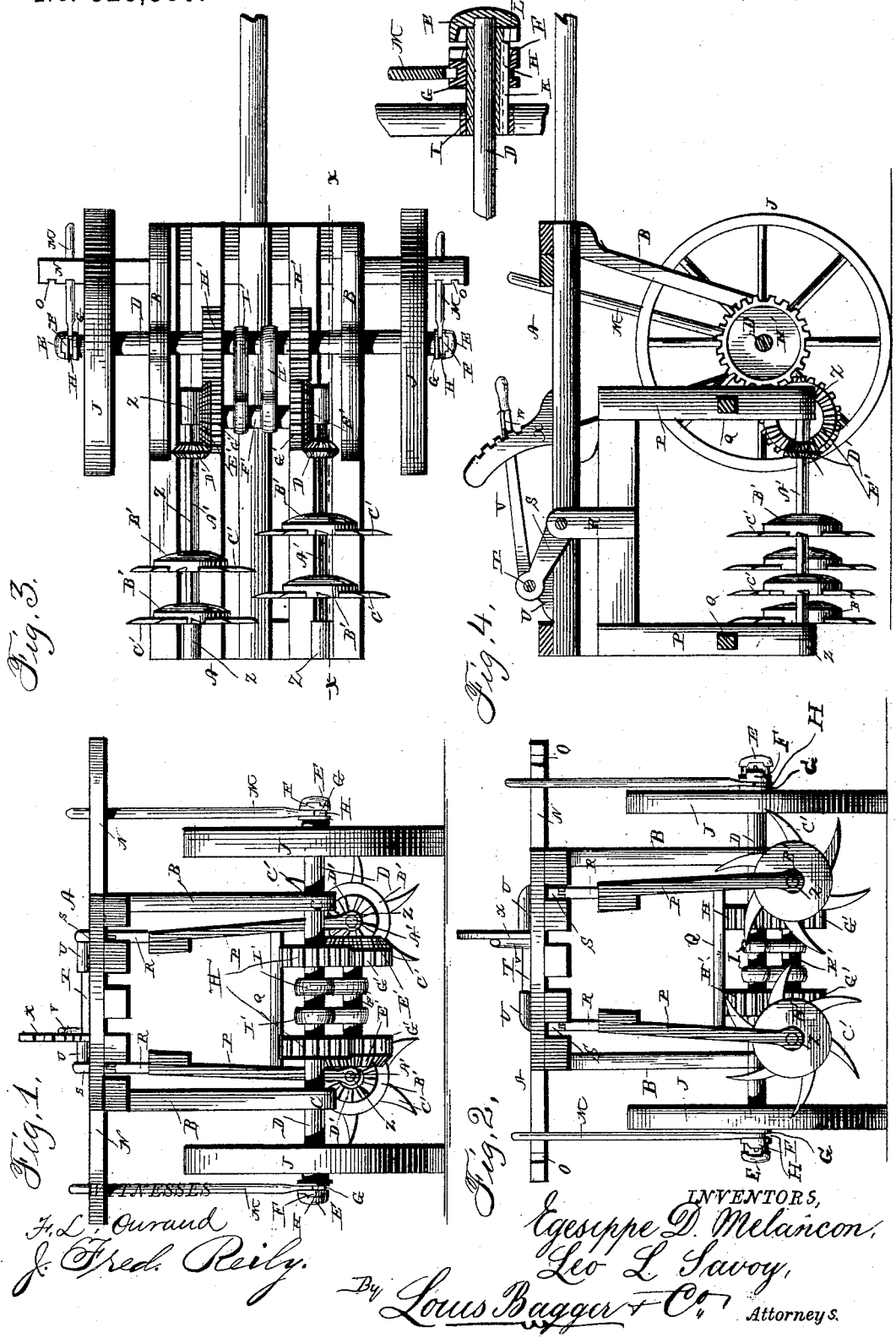

EGESIPPE D. MELANÇON AND LEO L. SAVOY, OF PAINCOURTVILLE, LA.

STUBBLE-DIGGER.

SPECIFICATION forming part of Letters Patent No. 328,330, dated October 13, 1885.

Application filed July 13, 1885. Serial No. 171,451. (No model.)

*To all whom it may concern:*

Be it known that we, EGESIPPE D. MELANÇON and LEO L. SAVOY, both residents of Paincourtville, in the parish of Assumption and State of Louisiana, have invented certain new and useful Improvements in Stubble-Diggers; and we do hereby declare that the following is a full, clear, and exact description of the invention, which will enable others skilled in the art to which it appertains to make and use the same, reference being had to the accompanying drawings, which form a part of this specification, and in which—

Figure 1 is a front view of our improved stubble-digger. Fig. 2 is a rear view of the same. Fig. 3 is a bottom view, and Fig. 4 is a longitudinal vertical section of the same on line $x\,x$, Fig. 3.

Similar letters of reference indicate corresponding parts in all the figures.

Our invention has relation to stubble-diggers or revolving cultivators; and it consists in the improved construction and combination of parts of the same, as hereinafter more fully described and claimed.

In the accompanying drawings, the letter A indicates the frame or platform of the machine, which platform is provided with two downwardly-projecting brackets, B B, projecting from the forward ends of the side edges of the platform, and provided at their lower ends with bearings C for the main or drive axle D. The outer ends of this axle are provided with caps or buttons E, the inner faces of which form half-clutches, which may mesh with half-clutches F upon the outer faces of disks G, having each a circumferential groove, H, and sliding upon the hubs I of the wheels J, which hubs are provided with feathers K, which fit in grooves L in the central apertures of the disks, and allow the disks to slide upon the hubs, while they will turn with them.

The circumferential grooves in the disks are engaged by the lower bifurcated ends of two levers, M, the upper ends of which engage with the notches O in the ends of the laterally-projecting arms N for the purpose of adjusting the levers to hold the clutches of the disks either in engagement with or out of engagement with the clutches upon the buttons at the ends of the axle.

Two rectangular frames, P, are connected at their forward and rear ends by means of cross-pieces Q, and the upper ends of the rectangular frames are provided with upwardly-projecting arms R R, to the upper ends of which the free ends of arms S S are pivoted, which arms are secured to a shaft, T, journaled in bearings U U upon the upper side of the platform, and provided with a hand-lever, V, which has a spring-lock, W, engaging perforations in a segmental bar, X, projecting upward from the upper side of the platform.

The lower ends of the end pieces, P, of the frames are formed with longitudinal bearings Z, in which the ends of two shafts, A' A', are journaled, and the disks B', which are provided with the curved digger or stirrer arms C' are secured upon these shafts. The curved arms upon these disks project in opposite directions with their curved ends, and the forward ends of the shafts are provided with beveled pinions D', which mesh with bevel-pinions E', turning upon a shaft, F', journaled at its ends in the lower ends of the forward end pieces of the rectangular frames in bearings at right angles to the bearings Z.

The bevel-pinions E' are provided with bevel-teeth and common cogs G' at their edges, and these cogs mesh with the cogs of two pinions, H' H', secured upon the middle of the drive-axle.

The shaft F' is supported or connected to the drive-axle by means of links I' I', the eyed ends of which fit around shaft F' and the drive-axle, connecting the forward end of the frame formed by the rectangular frames to the axle.

It will be seen that the digger-frame may be raised or lowered at will by means of the hand-lever, and that the axles bearing the toothed digger-disks will always be held in a horizontal position by reason of the upwardly-projecting arms R being pivoted to the arms upon the rock-shaft having the hand-lever, and by reason of the forward end of the digger-frame being pivoted to the drive-axle by means of the links I', which will guide the upward or downward swing of the frame so that the pinions upon the axle will always engage the pinions upon the frame.

The disks upon the hubs of the wheels may be thrown in or out of engagement with the clutches upon the axle, and in this manner the wheels may revolve without driving the diggers when the machine is transported from one place to another.

Having thus described our invention, we claim, and desire to secure by Letters Patent of the United States—

1. The combination, with the platform having the downwardly-projecting brackets, of the wheel-bearing drive-axle journaled in the ends of the brackets, the rectangular digger-frame having the upwardly-projecting arms at the upper ends of its side pieces, the rock-shaft having the hand-lever and the arms pivoted to the upwardly-projecting arms of the frame and journaled upon the upper side of the platform, and the links pivoted to the lower forward side of the digger-frame and to the middle of the drive-axle, as and for the purpose shown and set forth.

2. The combination of the drive-axle having the pinions at its middle, the vertically-adjustable digger-frame having longitudinal bearings in the lower ends of its side pieces, and having transverse bearings in the lower ends of the forward end pieces of the frame, longitudinal shafts journaled in the bearings of the frame, and having the digger-disks secured upon them, and having bevel-pinions secured to their forward ends, a transverse shaft journaled in the transverse bearings in the forward end pieces of the frame, and having the bevel-pinions provided with cogged rims meshing with the pinions upon the drive-shaft, and links fitting with their eyed ends upon the drive-axle and upon the transverse shaft at the lower forward end of the digger-frame, as and for the purpose shown and set forth.

In testimony that we claim the foregoing as our own we have hereunto affixed our signatures in presence of two witnesses.

EGESIPPE D. MELANÇON.
LEO L. SAVOY.

Witnesses:
CAMILLE D. LALANNE,
EUGÈNE E. CHAUVIN.